April 3, 1934.                K. HEBBEL                1,953,175
                    SUBTRACTIVE TWO-COLOR PICTURE
                         Filed June 12, 1931
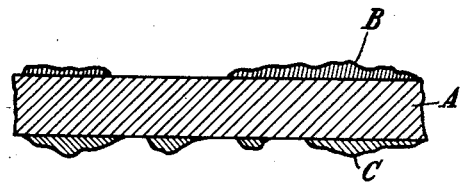
                                              Inventor:
                                         Konrad Hebbel,
                      By    Attorney
                                     Philip S. Hopkins.

Patented Apr. 3, 1934

1,953,175

UNITED STATES PATENT OFFICE 1,953,175

SUBTRACTIVE TWO-COLOR PICTURE

Konrad Hebbel, Wolfen, Kreis Bitterfeld, Germany, assignor to Agfa Ansco Corporation, Binghamton, N. Y., a corporation of New York Application June 12, 1931, Serial No. 543,975
In Germany June 13, 1930

3 Claims. (Cl. 95—2)

My present invention relates to the manufacture of two-color pictures and more particularly to a process of manufacturing such pictures according to the subtractive photographic method.

It is known that subtractive photographic, especially cinematographic multi-color pictures can be prepared on a support coated on both sides with a silver halide emulsion by printing on each of the layers a negative of a color sensation with perfect coincidence. The silver pictures which are produced in both layers must then be transformed into a color picture corresponding to the color sensation in question. For this purpose the picture is, for instance, on one side transformed into a Prussian blue picture, whereas the picture on the other side is dyed orange by a mordant dye. This process, however, involves the disadvantage that both layers must be treated separately, so that a relatively complicated treatment of the film is necessary.

According to the present invention, such multicolor pictures are produced by printing component color records on the layers, of which each is dyed in one of the component colors, developing the printed layers, then transforming the metallic silver in the layers into a heavy metal salt which reacts chemically with alkalies or acids and then developing the layers with an alkali or an acid. By this treatment the binding agent of the layers is dissolved to a degree corresponding with the quantity of the heavy metal salt, so that wash-out reliefs are obtained in both layers; since the latter are dyed in the primary colors a multi-color transparency is thus produced.

The organic dyes or pigments used for dyeing the emulsion layer must, of course, be so chosen that they are not affected by the developing or fixing baths or by the agents used for producing the wash-out relief. Dyes of this fastness even if relatively seldom, may be found in the different classes of dyes. I enumerate, for instance, from the diphenyl methane dyes Victoria blue B (Schultz, Farbstofftabellen, 6th edition, No. 559), from the triphenyl methane dyes the blue dye of the formula:

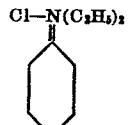

from the disazo dyes naphthamine-blue (Schultz, Farbstofftabellen, 6th edition, No. 338), diamine-red (Schultz, Farbstofftabellen, 6th edition, No. 366) and direct-green, from the trisazo dyes Columbia-green T. B. 60 and Columbia-green G. C., and finally the dyes being known under the trade-name Indanthrenes, which may be produced in the gelatine layer by oxidation of a corresponding commercial indigosol-base, for instance, indigosol A. B. (an ester of the corresponding leuco-base.)

In order to obtain reliefs with a satisfying continuous-tone, the emulsion layers, may additionally be dyed with filter dyes since the gradation of the relief produced widely depends from the filtering action of the dyes applied. The dyes added to the photographic emulsion and remaining unaltered in the different treating baths, may simultaneously be used as filtering dyes. Mostly, however, it will be necessary to incorporate into both sensitive layers a further dye in order to equalize the filtering action. In this case, the filter dye must be selected, as to be completely decolorized in the treating baths. Filtering dyes of this kind are, for instance, tartrazine (Schultz, Farbstofftabellen, 6th, edition, No. 23), aurine (Schultz, Farbstofftabellen, 6th edition, No. 555), acid-fuchsine (Schultz, Farbstofftabellen, 6th edition, No. 524), methyl blue (Schultz, Farbstofftabellen, 6th edition, No. 538), orange I (Schultz, Farbstofftabellen, 6th edition, No. 144), and colloidally dispersed pyrolusite.

When producing pictures according to the two-color process with the aid of a film bearing a photographic emulsion on each side generally inactinicly colored, intermediate layers are provided. In the process according to the present invention, however, such an intermediate layer is not applicable, since it would absorb small quantities of the dye with which the emulsion layer covering the intermediate layer, is dyed. On account of this fact, the latter would not be completely decolorized in the baths and would prevent the formation of pure white spots.

In order to obtain a pure white in the picture made according to my invention, it is necessary to expose the photographic emulsion layers long enough so that the deepest parts of the emulsion adjacent to the support, receive a light impression. Under these conditions it easily may occur that the emulsion layer on the opposite side of the support likewise is exposed to a certain extent especially, if the general sensitiveness of the emulsion layer on the rear side is accidentally higher than that applied on the front side. In order to avoid this difficulty, use is made of the method described hereafter:

When preparing the film, the sensitiveness of both photographic emulsions is selected in such a manner that they have a different sensitiveness against the action of differently colored light, so that when exposed to the action of light of a certain but different composition in one case the front emulsion and in the other case the emulsion on the rear side shows a higher sensibility.

This effect is gained in a very simple manner by providing on one side of the support a common photographic emulsion which has not been sensitized specially and is therefore sensitive for the blue light rays, and on the other side an emulsion sensitized for yellow light, said emulsion having a somewhat lower speed in the blue region.

As a particular advantage of my invention it may be mentioned that emulsions may be used which are relatively poor in silver; they may contain only $\frac{1}{10}$ of the amount of silver generally contained in positive emulsion layers.

The wash-out reliefs can be prepared from the developed and fixed pictures in the following manner.

The metallic silver is first transformed into a heavy metal salt which reacts chemically with alkalies or acids, and the layers are then developed with alkalies or acids. Also in this case the binding agent is dissolved according to the amount of the precipitate formed of the heavy metal salt, so that a wash-out relief is formed. This process has been described in British specification 366,552, in various modifications which are also applicable in the present process.

The process hitherto described yields two-color pictures. If, however, 3 or 4 partial pictures are to be combined, further colored partial pictures can be produced according to a known process, after the wash-out relief is complete, on or in one or both layers of the film. These partial pictures can, for instance, be applied by a printing or transfer process. Other partial pictures can likewise be produced on the film according to the imbibition process.

The new process involves the special advantage that both the emulsion layers of the film material coated on both sides are dyed from the beginning in the final partial colors, so that after printing both layers can be treated together and in the same way with the requiste baths. Both emulsion layers may, of course, also be dyed only after the preparation of the wash-out reliefs, but the special advantage afforded by the process according to this invention would then not be utilized.

My invention is illustrated by the example following hereafter; it is, however, not limited to the specific details given therein.

*Example.*—A celluloid film prepared in the usual manner to receive a photographic emulsion, is coated on one side with a photographic emulsion as usually used for manufacturing positive film, the emulsion being sensitized for yellow light rays by addition of 20 mg. of eosin per 500 grams of the emulsion. Before being applied to the film, 1500 grams of a solution of 150 grams of gelatin, 20 grams of diamine-red B (Schultz, Farbstofftabellen, 6th edition, No. 366) and 0.5 gram of methyl blue (Schultz, Farbstofftabellen, 6th edition, No. 538) in 2000 ccm. of water are mixed with the said photographic emulsion.

The other side of the film is coated with a mixture of 500 grams of a positive emulsion having a somewhat higher general sensitiveness, and 1500 grams of a green colored gelatin solution. The latter is prepared by dissolving 210 grams of gelatin in 1170 ccm. of water, by adding to this solution 980 grams of a solution of indigosol-green A. B. of 9 per cent strength and by further adding drop by drop while thoroughly stirring 200 ccm. of nitric acid of 12 per cent strength, and finally 200 ccm. of a solution of sodium nitrite of 10 per cent strength. In this manner, an indanthrene dye is formed in the gelatin which is not separated in form of flakes when maintaining these working conditions. The colored gelatin is poured into cooled dishes where it solidifies. It is cut in pieces similar as a photographic silver halide emulsion and washed for 24 hours in order to remove the soluble salts. Then it is warmed again and after addition of 20 ccm. of a solution of the dye orange I of 10 per cent strength it is mixed with the photographic emulsion.

The two-color image is obtainable with this film in the following manner:

A diapositive made from the negative which is taken behind a green screen, is printed upon the red emulsion layer of the film coated at both sides. The other positive color sensation originally taken behind a red screen, is printed upon the green colored emulsion layer. When printing upon the green colored layer, a light source is used as generally employed in a printing apparatus for cinematographic film, while exposure is made upon the red colored layer with the same light source through a slightly yellow colored screen.

After exposure, the film is developed and fixed in the usual way whereat, however, the use of a developer hardening gelatin, preferably is avoided. After being carefully washed, the pictures formed in both the colored layers are bleached out with a solution containing, for instance, 100 ccm. of water, 10 grams of copper acetate or sulfate, and 12 grams of potassium bromide.

The print is again washed with water and then treated with a solution containing 100 ccm. of water, 3 grams of potassium hydroxide, and 10 grams of sodium sulfate. A positive relief picture of the color sensations thus is obtained on both sides of the film.

Peculiar effects may be obtained when fixing of the developed layers is dispensed with, by a suitable development of the silver salt still contained in the gelatin relief. A more or less blackening of the picture is obtainable enhancing the effect of the two-color picture.

In the accompanying drawing a section of a two-color transparency made according to my invention, is shown:

In the figure A is the film base bearing on one side the red colored layer B and on the other side the green colored layer C; a relief being formed in both layers by a treatment according to my invention.

What I claim is:—

1. The process of preparing multi-color pictures on a support coated on both sides with silver halide emulsions, which comprises dyeing each of the light-sensitive layers with a dye stable to the agents contained in the different treating-baths in one of the partial colors, incorporating a filter dye in the layer which is soluble in the photographic baths, exposing both layers to light behind a diapositive of the corresponding color sensation, developing the pictures, transforming the silver in the layers into a heavy metal salt which reacts chemically with alkalies, and then producing wash-out reliefs by dissolving the binding agent with a solution containing potassium hydroxide.

2. A photographic film comprising a support coated on one side with a photographic positive silver halide emulsion sensitive for the blue light rays, said layer being colored with a dye remaining unaltered in the treating baths, and on the other side with a photographic positive silver halide emulsion of lower speed for the blue light and sensitized for a spectral color other than blue, said emulsion being colored with a dye approximately complementary to that contained in the emulsion at the other side of the support and remaining likewise unaltered in the usual photographic baths, at least one of these photographic emulsions containing a filter dye being decolorized in the said baths.

3. The process of preparing multi-color pictures on a support coated on both sides with silver halide emulsions which comprises dyeing one of said emulsion layers with an indanthrene dye made from indigosol green A. B. and orange I, dyeing the second emulsion layer having a lower initial sensitiveness with diamine red B and methyl blue and sensitizing the same to yellow by eosine, exposing the red emulsion layer behind a diapositive taken behind a green screen and the green emulsion layer behind a diapositive taken behind a red screen, developing the pictures, bleaching out the pictures by means of a solution of copper sulfate and potassium bromide, washing the print and treating the same with a solution of potassium hydroxide and sodium sulfate.

KONRAD HEBBEL.